United States Patent [19]

Macaulay et al.

[11] Patent Number: 4,683,467
[45] Date of Patent: Jul. 28, 1987

[54] IMAGE REGISTRATION SYSTEM

[75] Inventors: Malcolm Macaulay, Fullerton; William F. Singleton, Balboa Island, both of Calif.

[73] Assignee: Hughes Aircraft Company, Los Angeles, Calif.

[21] Appl. No.: 556,882

[22] Filed: Dec. 1, 1983

[51] Int. Cl.[4] .............................................. G02B 27/02
[52] U.S. Cl. .................................... 340/705; 340/700; 358/10; 358/60
[58] Field of Search ................. 353/30, 94; 358/3, 60, 358/64, 88, 231, 237, 239, 10; 340/700, 705, 706, 709, 710

[56] References Cited

U.S. PATENT DOCUMENTS 3,634,617 1/1972 Welford ................................. 358/60
3,943,279 3/1976 Austefjord ........................... 358/231
4,085,425 4/1978 Hamill ................................. 358/237

FOREIGN PATENT DOCUMENTS 56-35581 4/1981 Japan ..................................... 358/60

OTHER PUBLICATIONS

"Position Sensing Photodetectors", United Detector Technology, 3939 Landmark Street, Culver City, CA 90230, (advertisement).
"Quad High Performance Op Amp", Signetics, Mar. 1982 catalog, p. 89, NE/SE5514.

*Primary Examiner*—Gerald L. Brigance
*Assistant Examiner*—Ruffin B. Cordell
*Attorney, Agent, or Firm*—T. A. Runk; A. W. Karambelas

[57] ABSTRACT

An image registration system for registering multiple images on a screen is disclosed. A registration pattern is projected on the screen along with the image to be registered and in a fixed position in that image. A sensor apparatus for each image, having three photodetectors disposed in a right angle relationship is mounted on the screen at a predetermined location for determining the position of the registration pattern on the screen. The position of the registration pattern on the screen is determined by comparing the outputs of the three photodetectors. Difference signals are produced by the comparisons and are used to reposition the projected image to bring it into registration. The sensor apparatus are disposed so that when the registration patterns are in register with them, the images are in register with each other.

19 Claims, 5 Drawing Figures

IMAGE REGISTRATION SYSTEM

BACKGROUND OF THE INVENTION

The invention relates generally to image projection and more particularly, to image registration.

In some systems, an image projected on a screen must have a particular register, i.e., with a reference point or with another image or images projected on the same screen. As an example, where the images of two cathode ray tubes (CRT), each CRT image having a different color, are to be projected onto a single screen to form a single image having the color combination of both CRT images, the screen registration accuracy requirement for the two images can be very severe in order to avoid undesirable color fringing. The registration accuracy requirement may require registration within one picture element. In some systems where high resolution is required, a registration accuracy requirement of registration within one-fourth of a picture element may exist. For a CRT picture which is four inches in length in one dimension and has one thousand picture elements on that axis, a registration requirement of registration within 0.001 inch may exist.

Since image registration has been affected by component drift due to heat, warm-up times, age, use, etc., prior techniques invoked sophisticated designs of electrical, optical and mechanical components for stability in view of these factors. Even with these techniques, component drift was not compensated for and registration needed to be readjusted frequently. A further technique was the application of thermostatically controlled heaters to bring all components to a selected temperature which was above the ambient temperature. This technique still does not provide the registration accuracy required and the heat has an adverse effect on component reliability.

SUMMARY OF THE INVENTION

It is a purpose of the invention to overcome the above described problems and other problems by providing an image registration system which senses the position of the image to be registered on the screen and generates registration control signals in response to the screen sensed position. It is also a purpose to provide registration sensing and adjustments continually, automatically and rapidly.

It is also a purpose of the invention to provide an image registration system which is simpler and more accurate than prior techniques.

It is also a purpose of the invention to provide an image registration system which is relatively simple in construction and inexpensive to manufacture.

It is also a purpose of the invention to provide an image registration system which maintains image registration over a wide range of operating conditions. In particular, an image registration system relatively insensitive to wide temperature variation and which compensates for other factors tending to cause lack of image registration.

The foregoing purposes and other purposes are attained by the invention wherein there is provided an image registration system which senses the image position on the screen and provides positional control signals for repositioning the image relative to a screen reference point.

In particular, a photodetector apparatus which generates position signals in response to incident illumination is mounted on the screen. The photodetector apparatus has an illumination reference position established within it and generates signals corresponding to the position of incident illumination in relation to the reference position. In one embodiment, three photodetectors are mounted in a right angle relationship to each other. The vertex photodetector is the reference photodetector which establishes a reference position to which the two other photodetectors are compared. A registration pattern is projected on the screen and its illumination is detected by the photodetectors. The registration pattern has a fixed positional relationship to the associated projected image, thus by sensing the position of the registration pattern the image position is also known. The signal output of the two photodetectors are compared individually to the signal output of the reference photodetector to develop difference signals representative of the position of the registration pattern in relation to the position of the reference photodetector. The lack of difference signals indicates registration, whereas the presence of difference signals indicates an out of registration condition.

The difference signals are normalized as required for input to the image producing device to result in repositioning of the image. In the embodiment where a CRT image is the projected screen image, the difference signals are normalized to a current range. The currents representative of the difference signals are fed back to the centering/deflection coils of the CRT to reposition the image in accordance with the difference signals.

Other purposes, features and advantages of the invention will be more readily understood by consideration of the accompanying drawings taken in conjunction with the following detailed description, wherein like reference numerals designate like elements.

DETAILED DESCRIPTION OF THE INVENTION

Figure 1:
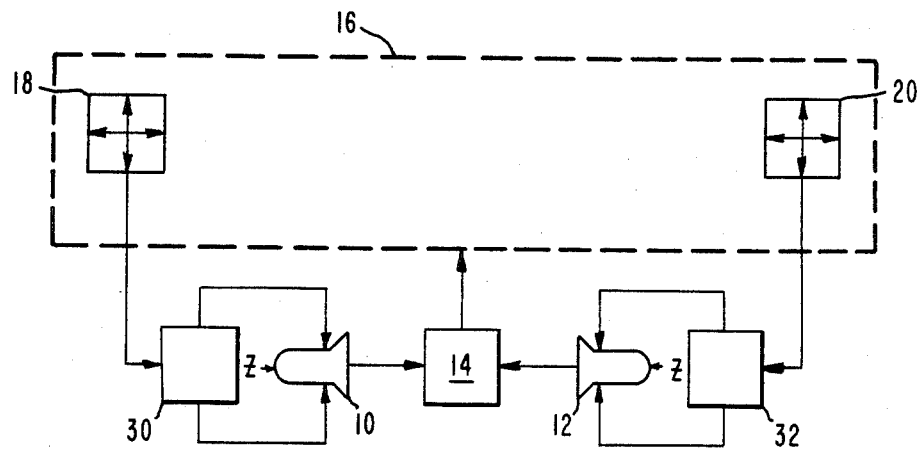
FIG. 1 is a functional block diagram of an image registration system in accordance with the invention.

Referring to the figures with more particularity, FIG. 1 shows a functional block diagram of an image registration system in accordance with the invention. In the embodiment shown in FIG. 1, the images from two cathode ray tubes (CRT) 10 and 12 are projected on a common screen 16 by means of a liquid crystal light valve (LCLV) and lens apparatus shown as block 14. The LCLV and lens apparatus 14 are known in the art and are not described herein with further specificity. For a reference to an LCLV and lens apparatus, refer to U.S. Pat. No. 4,127,322 to Jacobson et al. In the embodiment shown in FIG. 1, the image of one CRT 10 has a green color and the image of the other CRT 12 has a red color, the combination of the two forming the desired image. It is desired to project the differently colored images from the two CRTs 10 and 12 onto the common screen 16. In order to avoid color fringing and to have a clear picture on the screen 16, and to gain the advantage of color mixing of the red and green images, accurate registration of the two images on the screen 16 is required.

Figure 2:
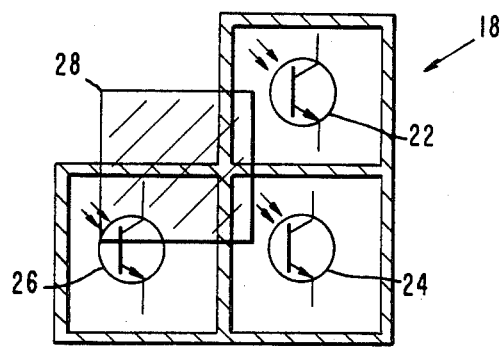
FIG. 2 is a diagrammatical view of an arrangement of three photodetectors and an incident registration pattern.

Registration of the two images from the two CRTs 10 and 12 is accomplished in FIG. 1, wherein two detector assemblies 18 and 20 are mounted on the screen 16, one detector assembly for each CRT image. These detector assemblies are substantially identical in function. In one embodiment of a detector assembly usable in the invention, the detector assembly 18 has three photodetectors 22, 24 and 26 arranged in a right angle relationship to each other. This arrangement is diagrammatically shown in FIG. 2. In this embodiment, the photodetector located at the vertex of the right angle is considered the reference photodetector 24, and the other two photodetectors are located equidistantly away from the reference photodetector, on the 90° legs. In FIG. 2, the photodetector 22 is located above the reference photodetector 24 and is termed the vertical photodetector 22. The photodetector 26 is located to the left of the reference photodetector 24 and is termed the horizontal photodetector 26. To the reference photodetector 24, the other two photodetectors 22 and 26 are compared. A registration pattern is included in the CRT image in a predetermined positional relationship to the rest of the image, and is projected on the screen from the associated CRT, which in this case is CRT 10. Because of the fixed positional relationship of the registration pattern to the CRT image, by locating the registration pattern, the location of the CRT image will be known.

As is functionally shown in FIG. 1, the image and/or registration patterns of the CRTs 10 and 12 are projected onto the screen 16. The detector assembly 18 dedicated to that CRT 10 will sense the illumination of the registration pattern when it is incident thereon. The photodetectors of the detector assembly produce photocurrents proportional to the amount of illumination detected by the active area of the photodetector.

FIG. 2 shows a detector assembly 18 usable in FIG. 1 with a registration pattern 28 incident thereon. As shown in FIG. 2, the registration pattern 28 is incident more upon the horizontal photodetector 26 than upon either the reference or the vertical photodetectors 24 or 22, but is incident equally upon the reference and vertical photodetectors 24 and 22. In the following description, it is given that all photodetectors are identical, i.e., they will all produce the same amount of photocurrent in response to the same amount of incident illumination. Each photodetector in FIG. 2 will produce photocurrent due to this incident illumination of the registration pattern 28; however, the horizontal photodetector 26 will produce more than either of the other photodetectors 22 and 24. By comparing the photocurrents produced by the horizontal and vertical photodetectors 22 and 26 individually to the reference photodetector 24, two difference signals will be produced. In the case of FIG. 2, the horizontal photodetector 26 will produce a greater photocurrent than the reference photodetector 24 thus indicating that the registration pattern 28 is off register in the left horizontal direction. The vertical photodetector 22 will produce an amount of photocurrent equal to the photocurrent produced by the reference photodetector 24 thus indicating that the registration pattern 28 is in register in the vertical direction. If all photocurrents were equal, this would indicate that the registration pattern was equally incident upon the photodetectors. Then the centroid of the registration pattern would be in registration with the centroid of the photodetector arrangement. Thus with the arrangement of three photodetectors shown in FIG. 2, the position of a registration pattern in any direction relative to the reference position can be determined.

To generate a difference signal in response to an off center registration pattern in the above embodiment, the photocurrent of the horizontal photodetector 26 is compared to the photocurrent of the reference photodetector 24, and the photocurrent of the vertical photodetector 22 is compared to the photocurrent of the reference photodetector 24. This is done in blocks 30 and 32 as shown by the functional block diagram of FIG. 1. Difference signals are produced by the comparisons which have a polarity indicative of which direction the registration pattern is out of register, and an amplitude indicative of how far out of register the registration pattern is. These difference signals are then normalized for use in repositioning the image generated by the image producing device, which in FIG. 1, is a CRT. Thus in FIG. 1, the difference signals may be normalized into a selected current range for applying to the CRT centering/deflection coils.

In functionally combining FIG. 2 into FIG. 1, three signal lines will be connected between detector assembly 18 and block 30, one line for each photodetector 22, 24 and 26. In block 30, the above described photocurrent comparisons will occur, difference signals will be produced and a normalization of those difference signals into repositioning currents will occur, one repositioning current for each of the photocurrent comparisons. These currents are applied to orthogonal centering/deflection coils of the CRT 10 and a repositioning of the image/registration pattern combination occurs.

In the case shown in FIG. 1 where two separate images from two separate CRTs are to be registered on the common screen 16, a separate detector assembly is dedicated to each CRT. These detector assemblies are located on the screen in a predetermined relationship to each other so that the CRT images are in register with each other when the centroids of their registration patterns are individually in register with the centroids of their dedicated detector assemblies. Thus, adjustments may be made to each CRT by its own image registration circuitry for repositioning its image.

By using a registration pattern and a detector assembly with each CRT, the images may be held in register on the common screen 16 automatically. Reregistration adjustments are performed automatically and continually. Temperature variations which typically cause drift, such as system warm-up, are compensated for since the position of the registration pattern, and therefore the image, is continually readjusted if it moves off the reference position. By projecting the registration patterns continually with the associated images, the images will be constantly in register since the image registration system continually readjusts the positions of the CRT images as required.

Figure 3:
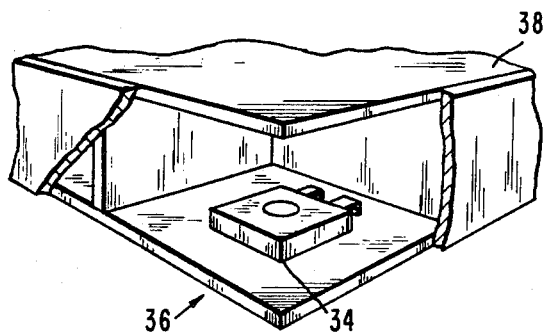
FIG. 3 is a perspective sectional view of one photodetector cell of the arrangement of FIG. 2.

A photodetector structure such as that shown in FIG. 3 is usable in the invention. The photodetector 34 is located in a cell 36 having opaque sides and an opaque bottom with a translucent cover 38. The translucent cover 38 is typically diffusing material which is located between the photodetector and the illumination to be detected. A diffuser film-polyester such as LDF6503TR by the 3M Company is usable. The diffusing material spreads out the incident illumination to achieve a broader and more continuous detection range from the photodetectors.

The cell shown in FIG. 3 has a square shape however other shapes are usable. The height of the cell walls is such that direct illumination from the registration pattern strikes the photodetector, but extraneous light, such as from overhead room lighting, is rejected at least partially. It has been found that making the inside surfaces of the cell nonreflective can improve the signal to noise ratio by absorbing extraneous light which enters the cell at an angle.

A square registration pattern such as that figuratively shown in FIG. 2 is usable in the invention. It has been found that a registration pattern of ten horizontal picture elements by ten vertical lines is usable. This results in a registration pattern of ten picture elements by ten picture elements. Other patterns are usable and generation of registration or test patterns by a CRT is well known in the art and is not further described herein. The relative sizes of the registration pattern and active detection area of the detector assembly should be such that movement of the registration pattern can be detected. A registration pattern which is somewhat smaller than the active area of the detector assembly is necessary to avoid a situation where the registration pattern has moved out of register but this movement is not detectable by the photodetectors. A registration pattern having a side length which is approximately equal to the center-to-center length between the reference photodetector and one of the other photodetectors has been found to avoid the above situation. This is shown in FIG. 2 where the registration pattern 28 is square and the side length is equal to the distance between the centers of the vertical photodetector 22 and the reference photodetector 24.

Where the size of the registration pattern is fixed, such as fixed at ten horizontal picture elements by ten vertical lines, the size of the active detection area of the detector assembly may require adjustment depending upon the screen size of the registration pattern. Where the image and associated registration pattern have been projected onto a large screen and enlarged to fill that screen, the center-to-center distances between the reference photodetector and the other two photodetectors may require lengthening to retain the relative size relationship between the registration pattern and the active detection area of the detector assembly. Conversely where the registration pattern is smaller, such as when projected onto a small screen, the active detection area of the detector assembly may need to be contracted.

Figure 4:
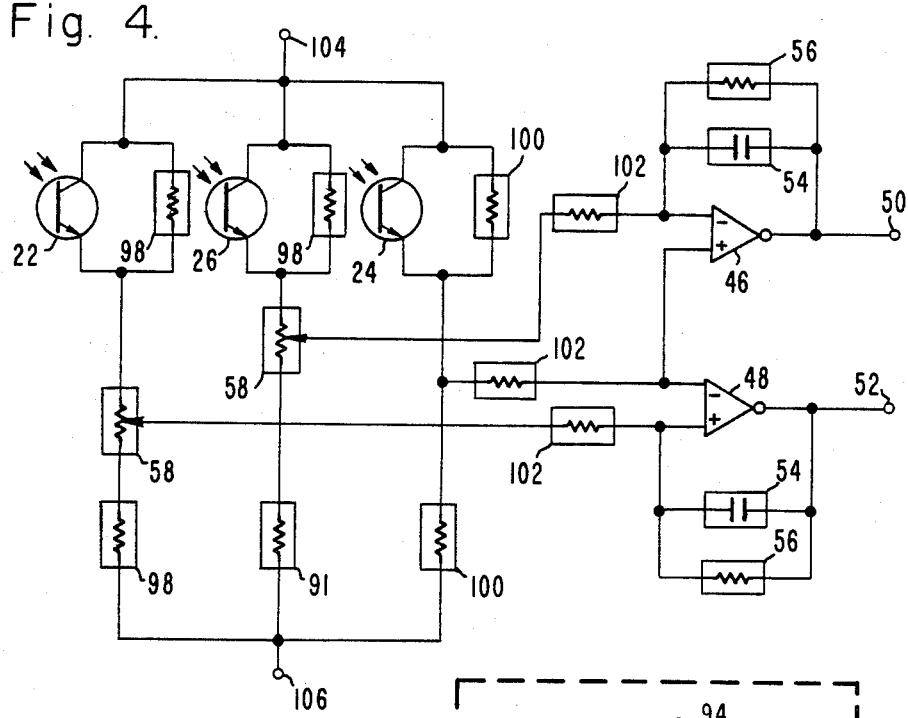
FIG. 4 is a schematic diagram of a difference signal generating circuit usable in the invention.

A difference signal generating circuit usable in the invention is shown in FIG. 4. As is shown, the photocurrents from the three photodetectors 22, 24 and 26 are compared in two operational amplifiers 46 and 48 to produce difference signals 50 and 52. In particular, a signal from the reference photodetector 24 is supplied to the same polarity inputs of both operational amplifiers 46 and 48. The opposite polarity input of one operational amplifier 46 is supplied with the signal from the horizontal photodetector 26 while the opposite polarity input of the other operational amplifier 48 is supplied with the signal from the vertical photodetector 22. Feedback capacitors 54 (1 μf) and feedback resistors 56 (10M ohms) are used for integration and gain purposes. Thus, amplified and integrated difference signals 50 and 52 are supplied at the outputs of the operational amplifiers 46 and 48.

Although previously described as being indentical, in practicality, photodetectors rarely are. Thus, a nulling technique is included as a part of the circuit shown in FIG. 4. When a registration pattern is in register on the detector assembly, the circuit shown in FIG. 4 is adjusted so that the difference signals 50 and 52 are zero. Variable resistors 58 (0-25K ohms) are supplied for this purpose. Thus, when the image is in register, the variable resistors 58 are adjusted until the difference signals 50 and 52 are zero. This compensation technique nulls out the differences between the photodetectors as well as between the other circuit components. This nulling technique also compensates for extraneous light striking the photodetectors.

Resistors 98 are 91K ohms, resistors 100 are 100K ohms and resistors 102 are 0.1M ohms. Power source 104 is +15 $V_{dc}$ and power source 106 is −15 $V_{dc}$.

Photodetectors usable in the circuit of FIG. 4 include the MRD 711 by Motorola Inc., Phoenix, Ariz. Operational amplifiers usable include the LM 741 by National Semiconductor Corp., Santa Clara, Calif. A different photodetector device may be used in place of the photodetectors 23, 24 and 26 shown in FIG. 4. A position sensing photodetector, such as the "SC" series by United Detector Technology, Culver City, Calif., provides X and Y axes positions from a reference point established within it.

In the embodiment where the difference signals themselves are not directly usable, such as in the CRT embodiment shown in FIG. 1, a normalization of those signals is effected. For a normalization of the difference signals 50 and 52 into a bipolar current range, the circuit 63 shown in FIG. 5 has been found to be usable. The bipolar current source 63 shown provides a current of ±twenty milliamperes from an input of ±ten volts to a centering/deflection coil 60 of the CRT to reposition the image of that CRT.

Figure 5:
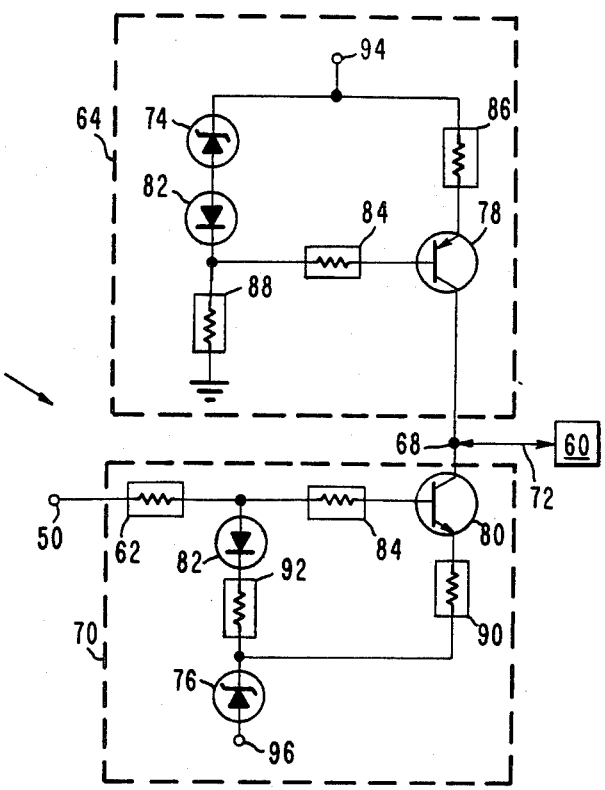
FIG. 5 is a schematic diagram of a bipolar current source usable in the invention.

In the circuit 63 shown in FIG. 5, an output, such as a difference signal 50 from the circuit shown in FIG. 4, is coupled to the input resistor 62 (3K ohms). The upper circuit part 64 of the bipolar current source 63 is a constant current source of ±twenty milliamperes which is output to a node 68. The lower circuit part 70 of the bipolar current source 63 draws current from the same node 68 in the range of zero to forty milliamperes as controlled by the difference signal 50. Therefore, current in the range of ±twenty milliamperes is present at the node 68 and on the line 72 to or from the centering/deflection coil 60. Zener diode 74 is a 1N757A and zener diode 76 is a 1N3826A, both made by National Semiconductor. Transistor 78 is a 2N2905A, transistor 80 is a 2N2219A and diodes 82 are IN4150, all available from Motorola Inc. Resistors 84 are 100 ohms, resistor 86 is 470 ohms, resistor 88 is 3K ohms, resistor 90 is 120 ohms and resistor 92 is 1K ohms. Power source 94 is ±30 V $_{dc}$ while power source 96 is −15 $V_{dc}$.

When used with the difference signal generating circuit of FIG. 4, two bipolar current sources as shown in FIG. 5 are required, each coupled to a different difference signal and to an orthogonal centering/deflection coil.

Thus there has been shown and described, a new and useful image registration system. Although the invention has been described in detail, it is anticipated that modifications and variations may occur to those skilled in the art which do not depart from the inventive concepts. It is intended that the invention be limited only by the scope of the claims, not by the description, and so the invention will include such modifications and variations unless the claims limit the invention otherwise.

What is claimed is:

1. An image registration system for registering a plurality of projected imsges, comprising:
    a plurality of projection means, each of the plurality for projecting a respective image and for adjusting the spatial position of the image in response to applied position signals, each image having a registration pattern at a predetermined relative location therein;
    a plurality of sensor means, each of which is associated with a respective one of the plurality of projection means, for sensing the spatial position of the registration pattern projected by the associated projection means and for applying position signals indicative thereof to the associated projection means, so as to obtain a predetermined spatial orientation between the images;
    wherein the sensor means comprises photodetector means comprising three photodetectors arranged in a right angle relationship, with the photodetector at the vertex of the right angle being the reference photodetector, and the other two photodetectors being directional photodetectors, each photodetector providing detection signals in response to detection of registration pattern illumination; and
    the sensor means further comprises processing means for processing the detection signals and forming the position signals thereby.

2. The image registration system of claim 1 wherein the sensor means further comprises processing means for respectively comparing the detection signals provided by the directional photodetectors to the detection signal provided by the reference photodetector and providing two difference signals thereby.

3. The image registration system of claim 1 further comprising three cells, each of which encompasses a respective one of the photodetectors, each having an opening for receiving illumination, and having diffusion means for diffusing the illumination prior to its reaching the photodetector.

4. The image registration system of claim 1 wherein the registration pattern is rectangular in shape having sides equal in length to the respective center-to-center distance between the reference photodetector and each directional photodetector.

5. The image registration system of claim 2 wherein the processing means further comprises normalizing means for normalizing the two difference signals into the position signals.

6. The image registration system of claim 5 wherein the projection means includes a cathode ray tube having beam centering/deflection means for positioning the cathode ray tube image in response to the position signals.

7. The image registration system of claim 6 wherein the normalizing means comprises a bipolar current source which normalizes the difference signals into predetermined current ranges for applying to the beam centering/deflection means.

8. The image registration system of claim 7 wherein the bipolar current source comprises a constant current generating circuit coupled to the beam centering/deflection means and a current control circuit also coupled to the beam centering/deflection means and coupled to the processing means, the current control circuit controlling how much current is applied to or drawn from the beam centering/deflection means in response to the difference signal.

9. The image registration system of claim 8 wherein the current control circuit comprises a circuit for drawing current in the range of zero to twice the amount of current generated by the constant current generating circuit, in response to the difference signal.

10. An image registration system for registering a plurality of images projected onto a common screen, comprising:
    a plurality of projection means for projecting the plurality of separate images onto the common screen, each image having a registration pattern disposed in a fixed orientation within the image, and each projection means having respective cathode ray tubes with beam centering/deflection coils;
    a plurality of photodetector sensors, each of which is associated with a respective one of the plurality of projection means, each photodetector sensor comprising three photodetectors arranged in a right angle relationship with the photodetector at the vertex of the right angle being the reference photodetector, the other two photodetectors being directional photodetectors, each photodetector providing detection signals in response to the detection of registration pattern illumination;
    the plurality of photodetector sensors collocated with the screen and having predetermined spatial relationships with each other such that when the registration patterns are in register with the associated sensors, then the images are in register with each other;
    a plurality of processing means, each of which is associated with a respective one of the plurality of sensors, for providing two difference signals by comparing the detection signal from the reference photodetector to the detection signal of one of the two directional photodetectors, thereby providing one difference signal, and comparing the detection signal of the reference photodetector to the detection signal of the other of the two directional photodetectors, thereby providing a second difference signal; and
    a plurality of repositioning means, each of which is associated with a respective one of the plurality of processing means, for controlling the current of the beam centering/deflection coils of the cathode ray tube in response to the difference signals, thereby positioning the image of the CRT.

11. An image registration system for registering a projected image with a reference position, comprising;
    projection means for projecting an image and for adjusting the spatial position of the image in response to applied position signals, the image having a registration pattern at a predetermined relative location therein; and
    sensor means for sensing the spatial position of the registration pattern and for applying position signals indicative thereof to the projection means, so as to obtain a predetermined spatial orientation between the image and the reference position;
    wherein the sensor means comprises photodetector means comprising three photodetectors arranged in a right angle relationship, with the photodetector at the vertex of the right angle being the reference photodetector, and the other two photodetectors being directional photodetectors, each photodetector providing detection signals in response to detection of registration pattern illumination; and the sensor means further comprising processing means for processing the detection signals and forming the position signals thereby.

12. The image registration system of claim 11 wherein the sensor means further comprises processing means for respectively comparing the detection signals provided by the directional photodetectors to the detection signal provided by the reference photodetector and providing two difference signals thereby.

13. The image registration system of claim 11 further comprising three cells, each of which encompasses a respective one of the photodetectors, each having an opening for receiving illumination, and having diffusion means for diffusing the illumination prior to its reaching the photodetector.

14. The image registration system of claim 11 wherein the registration pattern is rectangular in shape having sides equal in length to the respective center-to-center distance between the reference photodetector and each directional photodetector.

15. The image registration system of claim 12 wherein the processing means further comprises normalizing means for normalizing the two difference signals into the position signals.

16. The image registration system of claim 15 wherein the projection means includes a cathode ray tube having beam centering/deflection means for positioning the cathode ray tube image in response to the position signals.

17. The image registration system of claim 16 wherein the normalizing means comprises a bipolar current source which normalizes the difference signals into predetermined current ranges for applying to the beam centering/deflection means.

18. The image registration system of claim 17 wherein the bipolar current source comprises a constant current generating circuit coupled to the beam centering/deflection means and a current control circuit also coupled to the beam centering/deflection means and coupled to the processing means, the current control circuit controlling how much current is applied to or drawn from the beam centering/deflection means in response to the difference signal.

19. The image registration system of claim 18 wherein the current control circuit comprises a circuit for drawing current in the range of zero to twice the amount of current generated by the constant current generating circuit, in response to the difference signal.

* * * * *

UNITED STATES PATENT AND TRADEMARK OFFICE
CERTIFICATE OF CORRECTION

PATENT NO. : 4,683,467

DATED : Jul. 28, 1987

INVENTOR(S) : Malcolm Macaulay et al.

It is certified that error appears in the above-identified patent and that said Letters Patent is hereby corrected as shown below:

In the specification, column 6, line 23, replace numeral "23" with numeral --22--.

In the specification, column 6, line 56, replace "± 30" with --+30--.

In claim 1, line 2, replace "imsges" with --images--.

In the drawings, FIG. 4, replace "91" with --98--.

In the drawings, FIG. 4, reverse the polarity indications on amplifier 48.

Signed and Sealed this

First Day of November, 1988

Attest:

DONALD J. QUIGG

Attesting Officer     Commissioner of Patents and Trademarks